US012327442B2

(12) United States Patent
Iyengar et al.

(10) Patent No.: US 12,327,442 B2
(45) Date of Patent: Jun. 10, 2025

(54) VEHICLE DIAGNOSTIC SYSTEM AND METHOD HAVING SPECIALIZED DATA

(71) Applicant: Robert Bosch GmbH, Stuttgart (DE)

(72) Inventors: Venkatesh Gorur Krishna Iyengar, Apple Valley, MN (US); Matthew Pasztor, Kalamazoo, MI (US); Ashok Chidige, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 226 days.

(21) Appl. No.: 17/864,006

(22) Filed: Jul. 13, 2022

(65) Prior Publication Data

US 2023/0015791 A1    Jan. 19, 2023

Related U.S. Application Data

(60) Provisional application No. 63/223,320, filed on Jul. 19, 2021.

(51) Int. Cl.
*G07C 5/08* (2006.01)
*G06Q 20/40* (2012.01)
*G07C 5/00* (2006.01)

(52) U.S. Cl.
CPC ........... *G07C 5/0808* (2013.01); *G06Q 20/40* (2013.01); *G07C 5/008* (2013.01)

(58) Field of Classification Search
CPC .............................. G07C 5/0808; G06Q 20/40
USPC ....................................................... 701/29.1
See application file for complete search history.

(56) References Cited

U.S. PATENT DOCUMENTS

| 10,719,813 | B1* | 7/2020 | Beckmann | G06Q 10/20 |
| 2010/0017446 | A1 | 7/2010 | Andreason et al. | |
| 2011/0225096 | A1* | 9/2011 | Cho | G06Q 10/20 |
| | | | | 705/305 |
| 2019/0392401 | A1* | 12/2019 | Bellini | G06Q 10/20 |

OTHER PUBLICATIONS

Vehicle Service Pros, "Opus IVS partners with Boyd Group Services, Inc.", https://www.vehicleservicepros.com/industry-news/21231643. . . .
Vehicle Service Pros, "AsTech awarded patent for remote automotive diagnostics", https://www.vehicleservicepros.com/collision-repair/press-release.
OPUS/IVS, "DriveSafe OE-Endorsed Pre/Post Repair Scanning and Calibration", https://www.opusivs.com/products/collision-solutions/drivesafe.

* cited by examiner

*Primary Examiner* — Todd Melton
*Assistant Examiner* — Vincent Feng
(74) *Attorney, Agent, or Firm* — David Kovacek; Maginot, Moore & Beck LLP

(57) ABSTRACT

A vehicle diagnostic system and method utilizing a plurality of diagnostic data corpuses. A first corpus comprises conventional and well-known diagnostic data useful in a broad range of common service tasks. A second corpus comprises less well-known diagnostic data useful in less common service tasks. One or more specialty corpuses may comprise obscure, protected, or emerging diagnostic data for the last-common tasks specific to particular manufacturers of the vehicle or its components. The second corpus and one or more specialty corpuses may offer access only to users that have acquired sufficient authorization.

19 Claims, 2 Drawing Sheets

VEHICLE DIAGNOSTIC SYSTEM AND METHOD HAVING SPECIALIZED DATA

TECHNICAL FIELD

This disclosure relates to the servicing of a vehicle including diagnostic procedures.

BACKGROUND

Vehicle diagnostic services are a critical component of modern vehicle servicing. It is critical to accurately assess the operational condition of a vehicle prior to performing any service such as maintenance, calibration, or repair. An accurate assessment of the vehicle's condition can guide service personnel to an expedient and proficient performance of the necessary service tasks.

Accurate assessments of the vehicle's condition may require extensive and specialized technical knowledge. Modern vehicles may provide insights to their operational condition utilizing electronic data communication. Electronic data indicating the operational condition of the vehicle may be generated, such as diagnostic codes associated with the vehicle, a component of the vehicle, or one of the vehicle's systems. Additionally, several factors may complicate the diagnostic process and subsequent repairs. Technicians must be able to acquire vehicle operational data from the vehicle as well as vehicle ID data, as different manufacturers may utilize similar or identical operational data or diagnostic codes that have completely distinct meanings in the context of their respective vehicles. Vehicle operational data may differ from vehicle to vehicle, from component to component, and even from year to year of the same vehicle or component thereof. Additionally, the manufacturers may choose to restrict access to some data useful in completing a diagnostic service for reasons of safety, security, or intellectual property. This limited-access data may be desirable because it is for emerging technologies or for a newly-released vehicle, component, or system. This diagnostic service is additionally complicated when accounting for aftermarket components and systems that may behave differently from the stock models. Thus, a comprehensive diagnostic service may require a level of technical know-how that is both broad and deep, and may be expensive to acquire or maintain.

It would therefore be desirable to have a system that provides a technician or other service personnel with guidance and access to a wide range of diagnostic data corresponding to a wide range of vehicle types, vehicle components, and vehicle systems that may be encountered. It may further be advantageous to provide the system in such a way that access to the desired diagnostic data may be accomplished at a reduced cost.

SUMMARY

One aspect of this disclosure is directed to a vehicle diagnostic system comprising a first diagnostic processor, a first memory, a second diagnostic processor, a second memory, a specialty processor, and a specialty memory. The first diagnostic processor is in data communication with a vehicle communication interface (VCI) associated with a vehicle receiving service. The first diagnostic processor is further in data communication with the second diagnostic processor, and may seek a diagnosis from the second diagnostic processor is the diagnosis is not found in a first corpus associated with the first diagnostic processor. The second diagnostic processor is further in data communication with the specialty processor and may seek the diagnosis from the specialty processor if the diagnosis is not found in a second corpus associated with the second diagnostic processor. In some embodiments, the first diagnostic processor and the VCI may be in wireless data communication. In some embodiments, a membership status associated with the first diagnostic processor may be utilized to determine whether access to the contents of the second corpus or a specialty corpus associated with the specialty processor is permitted.

Another aspect of this disclosure is directed to a method of vehicle repair certification, the method comprising the steps of establishing data communication between a first diagnostic processor and a VCI and seeking a vehicle diagnosis within a first corpus associated with the first diagnostic processor. If a diagnosis is not found within the first corpus, a request may be made to a second diagnostic processor associated with a second corpus to seek the vehicle diagnosis within the second corpus. If the vehicle diagnosis is not found within the second corpus, a request may be made to a specialty processor associated with a specialty corpus to seek the vehicle diagnosis within the specialty corpus. Vehicle diagnostic data may be monitored during the method to discover when a repair has been properly completed with respect to the vehicle. In response to proper completion of all repairs, a certification of the repair may be generated by a certification processor. In some embodiments, the certification may be utilized to initiate a payment to the technicians performing the repairs from a third party, such as an insurance company.

A further aspect of this disclosure is directed to a computer-readable non-transitory storage medium having processor-executable instructions stored thereon that, when executed by the processor, cause the processor to execute the steps of a method of vehicle repair certification. The vehicle repair certification method comprises the steps of establishing data communication between a first diagnostic processor and a VCI and seeking a vehicle diagnosis within a first corpus associated with the first diagnostic processor. If a diagnosis is not found within the first corpus, a request may be made to a second diagnostic processor associated with a second corpus to seek the vehicle diagnosis within the second corpus. If the vehicle diagnosis is not found within the second corpus, a request may be made to a specialty processor associated with a specialty corpus to seek the vehicle diagnosis within the specialty corpus. Vehicle diagnostic data may be monitored during the method to discover when a repair has been properly completed with respect to the vehicle. In response to proper completion of all repairs, a certification of the repair may be generated by a certification processor. In some embodiments, the certification may be utilized to initiate a payment to the technicians performing the repairs from a third party, such as an insurance company.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
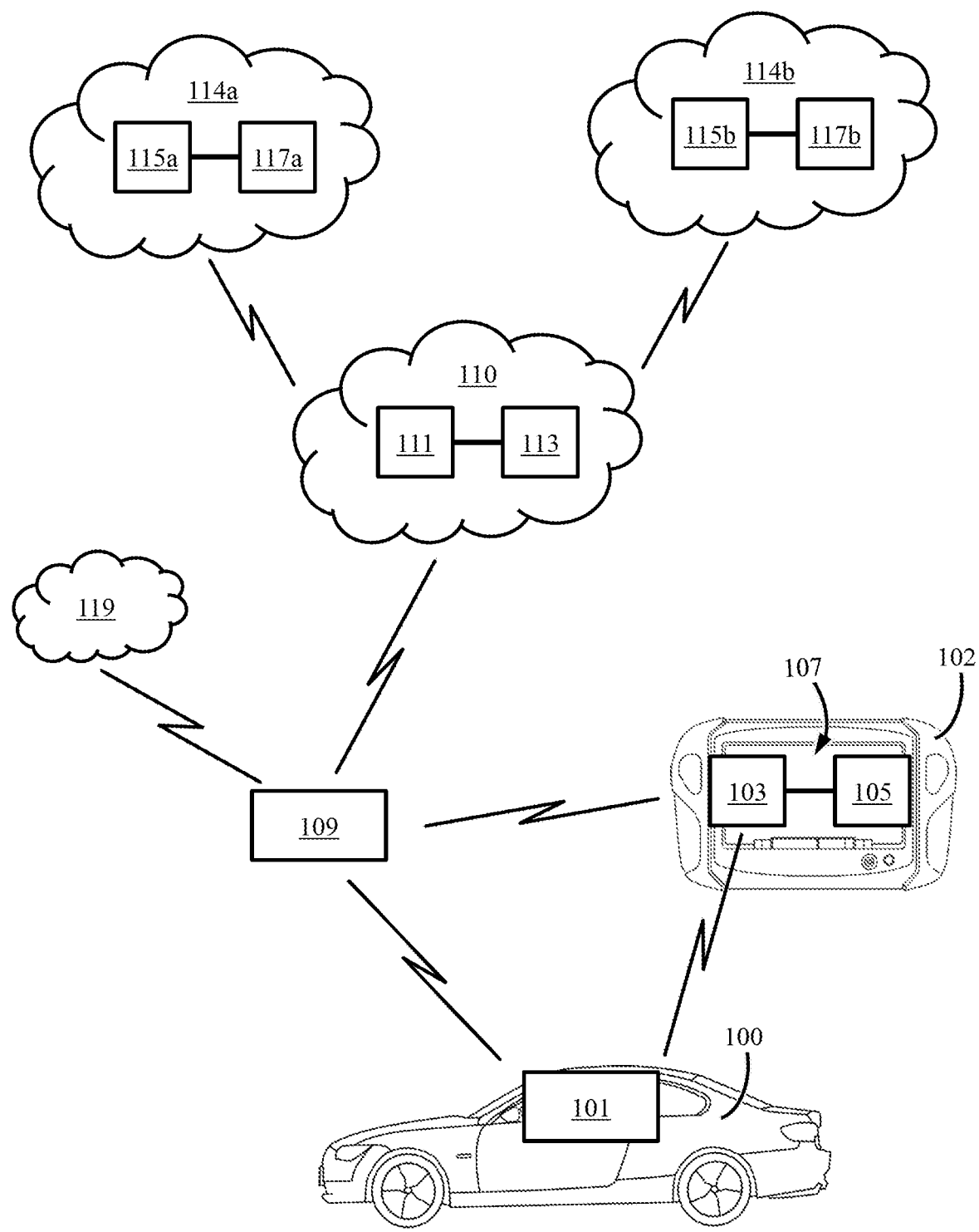
FIG. 1 is a diagrammatic view of a vehicle diagnostic system.

FIG. 1 shows a diagrammatic illustration of a vehicle diagnostic system according to one embodiment of the invention. The vehicle diagnostic system is compatible with a vehicle 100 subject to a service operation. A service operation may comprise a diagnostic service, a maintenance service, a repair service, or some combination thereof. In the teachings herein, the service operation shall be understood to comprise at least a diagnostic service to generate a diagnosis of a subject vehicle, such as vehicle 100, but other embodiments may comprise other or additional combinations of service operations without deviating from the teachings disclosed herein. Vehicle 100 further comprises a vehicle communication interface (VCI) 101. VCI 101 is configured to provide data communication between a processor associated with the vehicle and external devices, including diagnostic devices. In the depicted embodiment, VCI 101 may comprise a wireless connection port in data communication with a controller area network (CAN) bus of vehicle 100. Other embodiments may comprise other suitable configurations, such as a wired connection to the CAN bus, a specialized processor of a head unit within vehicle 100, a detachable dongle conforming to an onboard diagnostic (OBD) protocol, or any other suitable interface for vehicle 100 known to one of ordinary skill in the art without deviating from the teachings disclosed herein.

VCI 101 is operable to generate vehicle data useful for a service operation with respect to vehicle 100. The vehicle data may comprise vehicle ID data identifying features of vehicle 100, such as the make, model, and year of manufacture. The vehicle data may further comprise additional operational data detailing operational behavior of various components of vehicle 100. The operational data may comprise diagnostic codes, each generated diagnostic code associated with a particular condition of vehicle 100. In the depicted embodiment, the diagnostic codes may conform to a diagnostic trouble code (DTC) protocol, but other embodiments may utilize other protocols without deviating from the teachings disclosed herein. It is advantageous for the diagnostic data to further include the vehicle ID data, because similar or identical codes may be utilized by different vehicle manufacturers, and having the associated vehicle ID data advantageously singularly defines the conditions of vehicle 100.

The vehicle diagnostic system further comprises a diagnostic device 102 in data communication with VCI 101. The diagnostic device 102 may be utilized by a user in completion of a service operation. In the depicted embodiment, diagnostic device 102 may comprise a tablet computing device in wireless data communication with VCI 101, but other embodiments may comprise other configurations without deviating from the teachings disclosed herein. In some such embodiments, diagnostic device 102 may be embodied as a mobile processing device, a smartphone, a laptop computer, a wearable computing device, a desktop computer, a personal digital assistant (PDA) device, a handheld processor device, a specialized processor device, a system of processors distributed across a network, a system of processors configured in wired or wireless communication, or any other alternative embodiment known to one of ordinary skill in the art.

Diagnostic device 102 comprises a first diagnostic processor 103 and a first memory 105. The first memory 105 may comprise a first corpus of diagnostic data suitable for use in a diagnosis of the condition of vehicle 100 based on the generated vehicle data. The first corpus may comprise a set of general-use diagnostic data for comparison to the vehicle data. If a match is found for the vehicle data within the first corpus, diagnostic device 102 may generate a message to a user describing an associated diagnosis of the vehicle and present to the user via a human-machine interface (HMI) 107 of diagnostic device 102. HMI 107 comprises outputs for the user to receive information from diagnostic device 102, as well as input for the user to generate commands and requests for the system to utilize in operation. In the depicted embodiment, HMI 107 comprises a combination of inputs including hardware buttons, soft buttons, and a touchscreen display. Other embodiments may utilize additional inputs or other forms of inputs without deviating from the teachings disclosed herein, such as speech input, haptic or pressure input, computer mouse, keyboard, or any other form of processor input device recognized by one of ordinary skill in the art. In the depicted embodiment, HMI 107 comprises a combination of outputs including the touchscreen display and auditory outputs such as speakers. Other embodiments may utilize additional outputs or other forms of outputs without deviating from the teachings disclosed herein, such as external displays, wireless communication devices, audio transducers, haptic feedback components, or other output devices known to one of ordinary skill in the art.

In the depicted embodiment, first diagnostic processor 103 is in data communication with VCI 101 via a wireless connection. This connection permits an exchange of data and commands between first diagnostic processor 103 and VCI 101, such as the exchange of the vehicle data and the results of the diagnosis operation of first diagnostic processor 103. If a diagnosis result is not found within the first corpus, an error message may be generated and output via HMI 107. In response to the diagnosis result not being found within the first corpus, first diagnostic processor 103 may then initiate contact with external devices that may provide additional or different corpuses of diagnostic data.

In the depicted embodiment, the first corpus may be comprised of a broad set of diagnostic data suitable for general-use in a service facility, but may comprise some limitations. The limitations of the first corpus may comprise incomplete information with respect particular vehicle makes, particular vehicle models, particular years of manufacture for some vehicle models, particular systems within the vehicle, specific DTCs, or proprietary information that is not generally obtainable without special permissions or licenses. In some embodiments, limitations of the first corpus may be related to a membership status of the user associated with diagnostic device 102, wherein active memberships or memberships of a certain tier have direct access to certain portions of the first corpus that other users may not be permitted to access. The first memory 105 may comprise additional information indicating to first diagnostic processor 103 any known limitations of the first corpus with respect to the diagnostic data stored thereon. This additional information may inform how first diagnostic processor 103 should proceed in response to determining that the first corpus does not comprise a match for the vehicle data. In response to a vehicle diagnosis not being successfully found within the first corpus, first diagnostic processor 103 may generate a first request to be transmitted to external devices to seek a suitable vehicle diagnosis outside of the first corpus.

First diagnostic processor 103 is in data communication with a wireless access point (WAP) 109. WAP 109 is further in data communication with additional external devices, and may act as a data waylay for diagnostic device 102 and the external devices. In the depicted embodiment, WAP 109 may optionally be in additional wireless data communication with VCI 101 or other components of vehicle 100, but some embodiments may not comprise such connectivity without deviating from the teachings disclosed herein.

WAP 109 may be configured to communicate wirelessly via one or more of an RF (radio frequency) specification, cellular phone channels (analog or digital), cellular data channels, a Bluetooth specification, a Wi-Fi specification, a satellite transceiver specification, infrared transmission, a Zigbee specification, Local Area Network (LAN), Wireless Local Area Network (WLAN), or any other alternative configuration, protocol, or standard known to one of ordinary skill in the art. In some embodiments, WAP 109 may comprise a combination of wireless connectivity to some devices, such as diagnostic device 102, but wired connectivity to other external devices. In such embodiments, this arrangement may optimize the stability of data communication between WAP 109 and external devices, while also optimizing the usability of diagnostic device 102 by a user within a facility. In some embodiments, WAP 109 may instead by replaced by an access point comprising only wired connectivity that does not comprise any wireless connectivity without deviating from the teachings disclosed herein. In any embodiments utilizing wired connectivity, the associated access point may be configured to communicate wirelessly via one or more of an RF (radio frequency) specification, cellular phone channels (analog or digital), cellular data channels, a Bluetooth specification, a Wi-Fi specification, a satellite transceiver specification, infrared transmission, a Zigbee specification, Local Area Network (LAN), Wireless Local Area Network (WLAN), or any other alternative configuration, protocol, or standard known to one of ordinary skill in the art.

In some embodiments, diagnostic device 102 may be in data communication directly with external devices without relying upon a WAP 109 without deviating from the teachings disclosed herein.

In the depicted embodiment, WAP 109 is additionally in data communication with a diagnostic server 110, the diagnostic server 110 comprising a second diagnostic processor 111 and a second memory 113. The second memory 113 may comprise a second corpus of diagnostic data suitable for use in a diagnosis of the condition of vehicle 100 based on the generated vehicle data. The second corpus comprises at least some data stored therein that is distinct from data found within the first corpus. By way of example, and not limitation, the second corpus may comprise specialized data associated with particular vehicle systems, particular vehicle makes, particular vehicle models, particular vehicle years, aftermarket components, proprietary data, or some combination thereof without deviating from the teachings disclosed herein.

A vehicle diagnosis that corresponds to the vehicle data may be sought within the second corpus in response to the first request generated by the first diagnostic processor 103, which transmits the first request to the second diagnostic processor 111 by way of WAP 109. Second diagnostic processor 111 may seek a vehicle diagnosis within the second corpus in response to receipt of the first request. If a vehicle diagnosis is found, it may be relayed back to the diagnostic device 102 via WAP 109. If no vehicle diagnosis is found within the second corpus, second diagnostic processor 111 may generate an error message to be transmitted back to diagnostic device 102 via WAP 109 and output to the user via HMI 107.

Some or all data within the second corpus may be restricted to a limited access condition having membership requirements. Limited access data may be authorized by a membership status associated with the diagnostic device 102 generating the first request. The membership status is compared to one or more requirements that determine whether some or all of the diagnostic data within the second corpus is accessible to the diagnostic device 102. If the associated membership status of the diagnostic device 102 meets or exceeds the requirement or requirements, the data may be accessed within the second corpus. Membership status may be based upon a subscription payment status, a degree or certification achieved by the user of diagnostic device 102, a professional association with a particular third-party (such as an insurance company), an authorization provided by the operator of the diagnostic server 110, or any other membership status recognized by one of ordinary skill in the art without deviating from the teachings disclosed herein. In the depicted embodiment, a user having insufficient membership status may receive a message from the diagnostic server 110 indicating their insufficient membership status to access the desired data in the second corpus. This message or another message may additionally offer the user a chance to upgrade their membership status in order to acquire the necessary data. In the depicted embodiment, the membership status may be upgraded using subscription model wherein the user has access to the restricted data for as long as a regular payment is received. In the depicted embodiment, the user may be provided the option for an ad hoc authorization of the membership status upgrade, granting them immediate access to the restricted data under limited terms for a reduced cost compared to a regular ongoing subscription. By way of example, and not limitation, the ad hoc authorization may authorize the user to download the sub-portion of the second corpus corresponding specifically to the vehicle diagnosis associated with the first request from second memory 113 to first memory 105. This download may be a permanent addition to the first corpus or may only be available for review for a limited duration after the download without deviating from the teachings disclosed herein. The limited duration of time may be based upon a measure of absolute time (e.g., until 72 hours after the ad hoc upgrade is initiated), a limited number of accesses or downloads of the data (e.g., 10 downloads or 10 file accesses), or until another condition is met (e.g., access is available until a third party certifies that a repair associated with the first request has been properly completed for vehicle 100). After the limited duration, the membership upgrade may expire, and additional access to the data may require another membership upgrade, either by subscription of ad hoc authorization. Ad hoc authorizations may grant access to the entire second corpus, or only particular sub-portions thereof. In the depicted embodiment, different ad hoc authorization options may be available to the user providing different degrees of access to the second corpus. In some embodiments, permanent access to sub-portions of the second corpus may be offered in a piecemeal or "a la carte" fashion. Piecemeal authorization for access to the sub-portions of the second corpus may allow users to permanently download associated sub-portions to memory 105 for permanent inclusion in the first corpus, or may permit users a membership status that permits ongoing access to the respective sub-portions of the second corpus. In some embodiments, piecemeal access to the sub-portions of the second corpus may not include additional updates to the second corpus made after a predetermined time from the date of initiating piecemeal authorization. In the depicted embodiment, all these options to make adjustments to the membership status associated with first diagnostic device 102 may be available to the user, but other embodiments may comprise other or different combinations of membership status options without deviating from the teachings disclosed herein.

In practice, the second corpus may comprise less-frequently utilized diagnostic data than what is found in the first corpus. In such embodiments, diagnostic server 110 may provide infrequent access to the second corpus for multiple diagnostic devices 102 utilizing WAP 109, or perhaps for multiple WAPs 109 located in separate facilities, each of the WAPs 109 providing access to one or multiple diagnostic devices 102. In embodiments having multiple diagnostic devices 102, each first request will be associated with a particular one of the multiple diagnostic devices 102 that generated it, and the results of the search for a vehicle diagnosis will be returned from the diagnostic server 110 to the associated diagnostic device 102. In such embodiments, membership status data may be applied to individual users associated with a particular WAP 109 (e.g., a specialist technician with unique certifications compared to other technicians working within the same facility), or membership status may be shared membership statuses that are applied to some or all of the first diagnostic devices 102 associated with one or more of WAPs 109 (e.g., a group license enabling multiple technicians working for the same company to operate their first diagnostic devices 102 in multiple locations without impeding their functions because of changes in location). In the depicted embodiment, shared membership statuses may be offered at a discount compared to the same number of individual membership statuses being applied to each of the associated first diagnostic devices 102. In such embodiments, it is expected that fewer than all associated devices covered by the shared membership status will be requesting the same diagnostic data from the second corpus simultaneously. In practice, a predetermined limited number of users may simultaneously access the same sub-portion of the second corpus under the same shared membership status. If multiple users attempt to access the same sub-portion of the second corpus simultaneously, second diagnostic processor may generate a queue of users associated with the sub-portion of the second corpus. Users may be added to queue as they access the data, and may be removed from the queue upon discontinuing their access. If the queue of users exceeds the predetermined limited number, any users added to the queue after reaching the predetermined limit will be restricted in their access until an earlier user discontinues their access to the data. In some embodiments, second diagnostic processor 111 may generate a message to users asking if they would like to upgrade or adjust their shared membership status in order to expand the predetermined limit of simultaneous users. The upgrade of adjustment of the shared membership status may take the form of the subscription, ad hoc, or piecemeal access models as disclosed above. In the depicted embodiment, all of these options may be available to the users, but other embodiments may comprise different or additional options or combinations of options without deviating from the teachings disclosed herein.

In some instances, users may not successfully find the desired vehicle diagnosis in the second corpus. In such instances, the vehicle 100 may comprise a very new or experimental design having associated diagnostic data that is not generally available except from select specialty providers. Such specialty providers may be the original manufacturer of a vehicle, the original manufacturer of a specific vehicle component or system, an entity that holds an exclusive license to provide the particular vehicle diagnosis data, or perhaps a technical support service that specializes in rare or discontinued vehicles or components that are otherwise no longer supported by other service providers. In such instances, the desired vehicle diagnosis associated with the vehicle operational data may not be available even in the second corpus. In such instances, second diagnostic processor 111 may generate a second request to one of a number of specialty servers 114 that are associated with a particular specialty provider. Each of specialty servers 114 comprises at least a specialty processor 115 and a specialty memory 117, each of the specialty memories 117 comprises a specialty corpus having vehicle diagnostic data stored therein. The vehicle diagnostic data stored in a specialty corpus may comprise data that is related to very new, experimental, prototype, or developing vehicles or components. Some specialty corpuses may be comprised in part or in entirety of data that is protected with licenses or other legal restrictions. In practice, each of the specialty corpuses is expected to be accessible only based upon a particular membership status dictated by the operator of the associated specialty server 114.

In such arrangements, the membership statuses required to access the specialty corpuses may be arranged in one or more of the ways described above with respect to access of the second corpus. In practice, the associated membership status may be associated with the diagnostic server 110, as well as with any individual diagnostic device 102. In arrangements in which the membership status is associated to the diagnostic server 110, the diagnostic server 110 may "lend" its access to one or more of the specialty corpuses to a diagnostic device 102 in exchange for a fee. This fee may be paid using one or more of the subscription, ad hoc, or piecemeal membership status models as described above with respect to the second corpus. Typically, access to the specialty corpuses is expensive. When membership statuses are applied to the diagnostic server 110, the diagnostic server 110 may provide indirect access to the specialty corpuses to individual diagnostic devices 102 as part of a membership plan. In such a plan, the operators of the diagnostic server 110 may pay the expensive costs of continued access to one or more specialty corpuses, and offer limited access to the one or more specialty corpuses to users of the diagnostic devices 102 in exchange for a lesser cost. In such situations, users of the diagnostic devices 102 benefit because they each pay a lesser cost in exchange for only the particular access to the second corpus or specialty corpuses that apply to their work, while the operator of the diagnostic device benefits because the plurality of diagnostic device 102 users effectively subsidize the costs of the access to the specialty corpuses when their collective lesser fees are larger than the combined fees associated with access to each of the specialty corpuses.

Access to the specialty corpuses or sub-portions thereof may be restricted by membership status associated with an individual diagnostic device 102 in the same manner as applied above with respect to access to the second corpus or sub-portions thereof. Adjustments and upgrades to membership status may be made with respect to access to one or more specialty corpuses in the same manner as applied above with respect to adjustments and upgrades to membership status associated with access to the second corpus as applied above. Simultaneous access to a specialty corpus or sub-portion thereof may be limited utilizing user queues generated by an associated specialty processor 115 in much the same way as disclosed above with respect to user queues generated by second diagnostic processor 111 to limit simultaneous access to the second corpus. In the depicted embodiment, each of these access limitations or restrictions may be implemented in combination, but other embodiments may comprise other combinations without deviating from the teachings disclosed herein.

Once a vehicle diagnosis is found in either the second corpus or one of the specialty corpuses, the vehicle diagnosis is returned to the diagnostic device 102 associated with transmission of the associated first request. In the event that a vehicle diagnosis cannot be found in the second corpus or any of the specialty corpuses, an error indication may be generated and transmitted to the associated diagnostic device 102 that generated the associated first request. In such instances, the associated diagnostic device 102 may present the error indication to the user via the HMI 107.

In the depicted embodiment, diagnostic device 102 may be in regular or continuous communication with VCI 101. In such instances, the associated vehicle data may be regularly or continuously updated in response to changes in the conditions of vehicle 100. For example, the vehicle data may be updated to no longer include a DTC in response to completion of an associated service task. Service tasks may comprise one or more of a maintenance task, repair task, calibration task, diagnostic task, or other service intended to ensure proper and safe operation of the vehicle 100 or one or more of its associated components or systems. As the vehicle data is updated in response to the completion of service tasks, an external party may be contacted with indications of the progress of service tasks desired for completion with respect to vehicle 100. In the depicted embodiment, the external party may comprise a certification server 119 in data communication with diagnostic device 102. In the depicted embodiment, certification server 119 is in data communication with diagnostic device 102 by way of WAP 109, but other embodiments may comprise other arrangements without deviating from the teachings disclosed herein.

In response to completion of a service task, a diagnostic device 102 may transmit a work record comprising vehicle data, changes in vehicle data, one or more vehicle diagnoses, or additional data to the certification server for review of service task. The additional data may comprise work logs, schematics, image data, audio data, or video data depicting the operational condition of vehicle 100 before and after completion of a service task associated with a vehicle diagnosis. In the depicted embodiment, the additional data may additionally depict the operational condition of vehicle 100 at one or more stages during the service task completion without deviating from the teachings disclosed herein. Once the work record has been transmitted to the certification server 119, the work record may be reviewed. The review of the work record may be accomplished by a human technical expert, or may be perform autonomously by a processor comparing the vehicle data generated before and after the completion of the associated service task. If the review of the work record is completed and the work is deemed satisfactory, the certification server 119 generates a certification indicator documenting successful completion of the associated service task.

Certification server 119 may generate one or more of a number of distinct certification indicators, each of the certification indicators associated with a particular service task. A repair certification indicator indicates successful completion of a repair task restoring a proper functional operation to the vehicle, a component of the vehicle, or a system of the vehicle. A maintenance certification indicator indicates successful completion of a maintenance task preserving proper functional operation to the vehicle, a component of the vehicle, or a system of the vehicle. A calibration certification indicator indicates successful completion of a calibration service task restoring or preserving proper functional operation to a component of the vehicle or a system of the vehicle. A diagnostic certification indicator indicates successful completion of a diagnostic service task confirming the current functional operation of the vehicle, a component of the vehicle, or a system of the vehicle. A safety certification indicator indicates successful completion of a service task associated with a safety function of the vehicle. A legal certification indicator indicates successful completion of a service task associated with a function of the vehicle that is mandated by a government for legal operation of the vehicle. Other certification indicators may be utilized instead of, or in combination with, one or more of these listed certification indicators without deviating from the teachings disclosed herein.

Once generated, the one or more certification indicators may be transmitted from certification server 119 to diagnostic device 102. The one or more certification indicators may be used to document the operational status and service history of vehicle 100. The operational status and service history of the vehicle 100 may be stored in a memory, such as first memory 105, or any other memory without deviating from the teachings disclosed herein. The certification indicators may be used by local governments to document that vehicle 100 meets the criteria for an emissions check, safety check, or other functional assessment of the vehicle necessary for legal operation on public roads. The certification indicators may be used by insurance companies to document completion of service tasks prior to transferring payment to service personnel working on vehicle 100. The certification indicators may be collected into a vehicle history useful to a person interested in selling or buying vehicle 100. These instances are listed by way of example, and not limitation, and other utilizations of the certification indicators may be realized without deviating from the teachings disclosed herein.

Transmission of the vehicle data, vehicle diagnoses, work reports, and other data between elements of the vehicle diagnostic system may comprise large data files containing potentially sensitive information. For this reason, transmission of this data may be realized utilizing specialized data protocols designed specifically for the transmission of these combinations of data. In the depicted embodiment, the vehicle diagnostic system may utilize data communication that conforms to a J2534 protocol. A J2534 protocol utilizes a proprietary formatting of data that optimizes packet size and also encrypts the data to help preserve confidentiality of the data within the transmission. A J2534 protocol may be specially-adapted to optimize the seeking and transmission of vehicle diagnosis data within the first corpus, second corpus, or one or more of the specialty corpuses comprised of such data. In the depicted embodiment, a J2534 protocol may be utilized for all transmissions between diagnostic device 102 and WAP 109, WAP 109 and diagnostic server 110, diagnostic server 110 and any of specialty servers 114, or WAP 109 and certification server 119. In the depicted embodiment, a J2534 protocol may be utilized in at least some transmissions between diagnostic device 102 and VCI 101. In some embodiments, diagnostic device 102 may not rely upon WAP 109 for data communication between diagnostic server 110 or certification server 119. In such embodiments, diagnostic device 102 may utilize a J2534 protocol in at least some transmissions with one or more of diagnostic server 110 or certification server 119. In some embodiments, the system may permit users to optionally utilize a J2534 protocol. Optional utilization of a J2534 protocol may advantageously enhance compatibility with older or specialty devices in data communication with one or more elements of the vehicle diagnostic system. In some embodiments, different exchanges of data within the system may utilize different transmission protocols in combination without deviating from the teachings disclosed herein.

Figure 2:
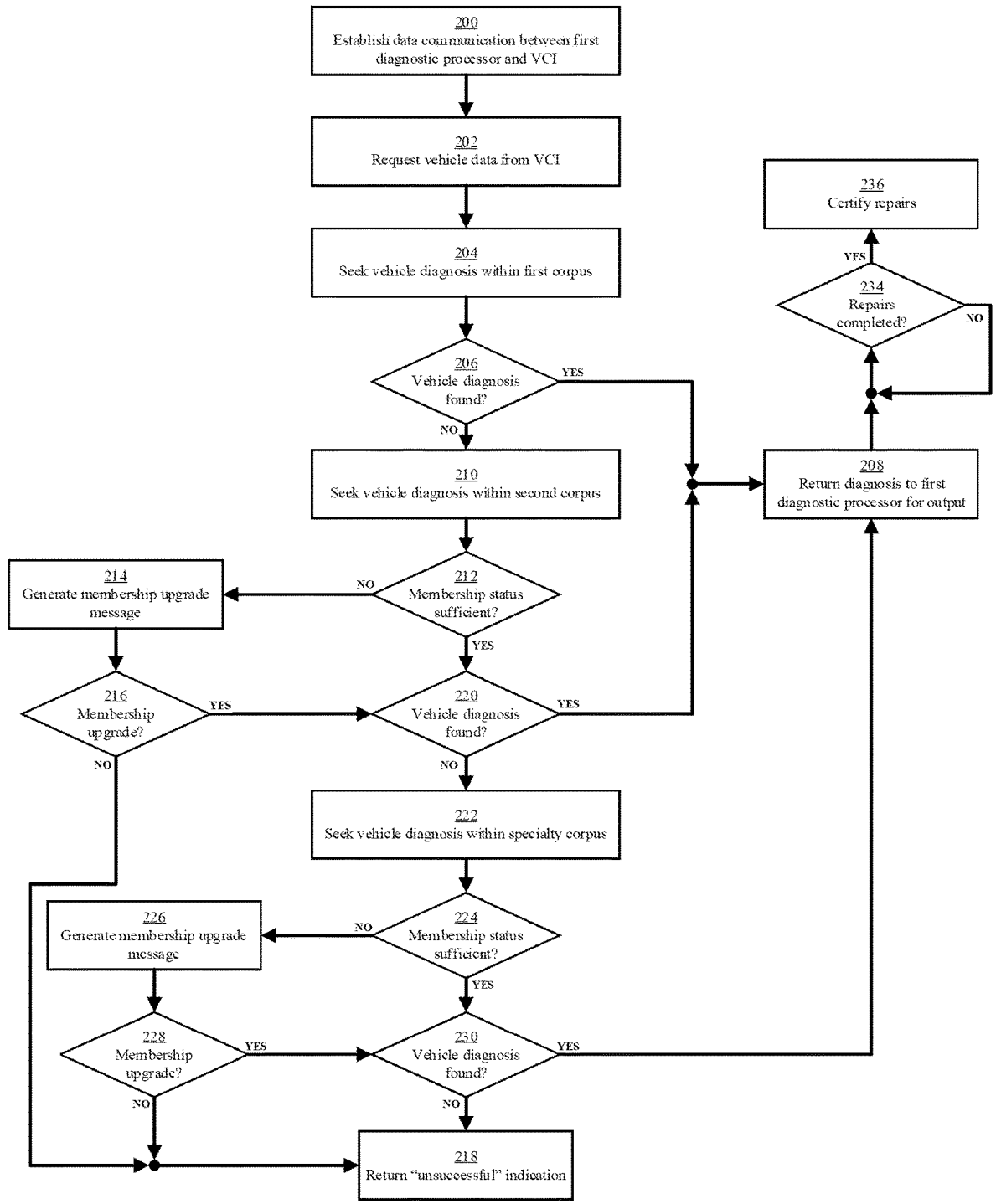
FIG. 2 is a flowchart illustrating a method of vehicle diagnostic and repair certification.

FIG. 2 is a flowchart illustrating a method of operating a vehicle diagnostic system. The depicted method may be performed using one or more processors. In some embodiments, the method may described as a series of processor-executable instructions stored upon a non-transitory computer-readable storage medium that, when ready by a processor, cause the processor to perform the steps of the method described herein. In the depicted embodiment, the method generates a vehicle diagnosis for a vehicle having a vehicle communication interface (VCI) operable for data communication with the system performing the method. In the depicted embodiment, the method may be performed by the vehicle diagnostic system depicted in FIG. 1, but other implementations may be realized without deviating from the teachings disclosed herein.

The method therefore begins at step 200, wherein data communication is established between a first diagnostic processor and the VCI. The first diagnostic processor may be embodied within a computing device, such as first diagnostic device 102 (see FIG. 1), but other embodiments may comprise other implementations without deviating from the teachings disclosed herein. Data communication may be established using a wireless connection or a wired connection without deviating from the teachings disclosed herein. After data communication is established between the first diagnostic processor and the VCI, the method proceeds to step 202, where vehicle data is requested from the VCI. The vehicle data requested provides operational data indicating the operational state of the vehicle, as well as vehicle ID data. The operational data may comprise diagnostic codes such as diagnostic trouble codes (DTCs) that correspond to specific operational conditions of the vehicle, a component of the vehicle, or a system of the vehicle. The vehicle indicates identifying information of the vehicle, such as the vehicle's make, model, and year of manufacture. The vehicle ID data may additionally provide identifying data for aftermarket modifications or other customizations of the vehicle, the vehicle's components, or the vehicle's systems.

The first diagnostic processor is associated with a first corpus of vehicle diagnoses. The vehicle data from the VCI may be compared to the contents of the first corpus to seek a vehicle diagnosis with the first corpus at step 204. If a match is found in step 206, the method may proceed to step 208 and return the vehicle diagnosis to the user for output. The output may have a visual component, audio component, video component, haptic component, or some combination thereof for output to the user via a human machine interface (HMI). The user may interact with the HMI to determine the vehicle diagnoses that are applicable to the vehicle in order to successfully complete a service action.

If a vehicle diagnosis is not found, the method instead proceeds to step 210, where the vehicle data is utilized to seek a vehicle diagnosis in a second corpus having at least a sub-portion thereof that is distinct from the contents of the first corpus. In the depicted embodiment, at least some sub-portions of the second corpus may comprise limited access portions requiring authorization tied to a membership status of the user. Prior to comparing the vehicle data to the second corpus, a membership status of the associated user is checked at step 212 to determine if the user holds a sufficient status to access the second corpus or requisite sub-portions thereof. If the user does not have sufficient membership status, a message may be generated and returned to the user indicating such at step 214. The system may additionally offer an opportunity for the user to upgrade their membership status at step 216. Membership upgrades may be accomplished according to any authorization method known in the art, such as those disclosed above in FIG. 1 with respect to access to diagnostic server 110 or a specialty server 114. Other embodiments may comprise other authorization methods without deviating from the teachings disclosed herein.

If the user declines to upgrade their membership status, the method proceeds to step 218 and generates an indication that the diagnostic method returned in an unsuccessful result. In this instance, the indication may specify that the diagnosis was not obtained because the user is not authorized to access the additional information within the second corpus. As depicted, the method terminates upon reaching step 218. In the depicted embodiment, steps 212, 214, and 216 form a first membership loop that is utilized to address an insufficient membership status to access the second corpus. In the depicted embodiment, the first membership loop is initiated after the step 210 when the system first initiates access to the second corpus. Other embodiments may instead initiate the first membership loop prior to initiating contact with the second corpus at step 210 without deviating from the teachings disclosed herein. Other embodiments may optionally omit the first membership loop of the method without deviating from the teachings disclosed herein.

If the user has or acquires sufficient membership status to access the second corpus, the method proceeds to step 220, where the contents of second corpus are searched for a suitable vehicle diagnosis. If a suitable diagnosis is found, the method proceeds to step 208, where the vehicle diagnosis is returned to the user.

If a suitable vehicle diagnosis is not found, the method proceeds to step 222, where the vehicle data is utilized to seek a vehicle diagnosis in a specialty corpus having at least a sub-portion thereof that is distinct from the contents of the first corpus and the second corpus. In the depicted embodiment, at least some sub-portions of the specialty corpus may comprise limited access portions requiring authorization tied to a membership status of the user. Prior to comparing the vehicle data to the second corpus, a membership status of the associated user is checked at step 224 to determine if the user holds a sufficient status to access the specialty corpus or requisite sub-portions thereof. If the user does not have sufficient membership status, a message may be generated and returned to the user indicating such at step 226. The system may additionally offer an opportunity for the user to upgrade their membership status at step 228. Membership upgrades may be accomplished according to any authorization method known in the art, such as those disclosed above in FIG. 1 with respect to access to diagnostic server 110 or a specialty server 114. Other embodiments may comprise other authorization methods without deviating from the teachings disclosed herein.

If the user declines to upgrade their membership status, the method proceeds to step 218 and generates an indication that the diagnostic method returned in an unsuccessful result. In this instance, the indication may specify that the diagnosis was not obtained because the user is not authorized to access the additional information within the specialty corpus. As depicted, the method terminates upon reaching step 218. In the depicted embodiment, steps 224, 226, and 228 form a second membership loop that is utilized to address an insufficient membership status to access the specialty corpus. In the depicted embodiment, the second membership loop is initiated after the step 222 when the system first initiates access to the specialty corpus. Other embodiments may instead initiate the second membership loop prior to initiating contact with the specialty corpus at step 210 without deviating from the teachings disclosed herein. Other embodiments may optionally omit the specialty membership loop of the method without deviating from the teachings disclosed herein.

If the user has or acquires sufficient membership status to access the second corpus, the method proceeds to step 230, where the contents of specialty corpus are searched for a suitable vehicle diagnosis. If a suitable diagnosis is found, the method proceeds to step 208, where the vehicle diagnosis is returned to the user.

If a suitable diagnosis is still not found in step 230, the method proceeds to step 218 and generates an indication that the diagnostic method was unsuccessful because the vehicle data cannot be accommodated by the contents of the first corpus, second corpus, and specialty corpus in combination. As depicted, the method terminates upon reaching step 218.

In the depicted embodiment, the method is depicted with respect to a single specialty corpus associated with step 222. In some embodiments, multiple specialty corpuses may be available for consideration, each of the specialty corpuses having a membership status requirements. In such embodiments, each of the specialty corpuses may have a unique membership status requirement for access, or some or all of the specialty corpuses may share a membership status requirement without deviating from the teachings disclosed herein. In embodiments having a plurality of specialty corpuses, selection of one or more specialty corpuses that may comprise appropriate diagnostic data at step 222 may be aided by analysis of the vehicle data.

In some embodiments, the method may terminate upon reaching step 208. In other embodiments such as the depicted embodiment, the method may proceed to additional steps. In the depicted embodiment, after the return of the vehicle diagnosis to the first diagnostic processor at step 208, the method may continue to step 234 where the vehicle data is updated and monitored while service tasks for the vehicle are performed by a user of the diagnostic device. Upon completion of a service task, the vehicle data may be updated, and step 234 may be initiated to determine if the vehicle data indicates any remaining repairs or service tasks are required for the vehicle. If the updated vehicle data still comprises additional need for service tasks, the method returns to step 234 to perform another check after another update of the vehicle data in response to completion of an additional service task. If no additional service tasks are warranted, the method may proceed to step 236 where a certification of the completion of the service tasks may be generated. In the depicted embodiment, the method terminates upon reaching step 236. In other embodiments, steps 234 and 236 may be optional or omitted without deviating from the teachings of the method disclosed herein.

The certification generated at step 236 may be utilized by the user or external entities for reasons such as the reasons disclosed above with respect to certification server 119 (see FIG. 1). Other certification processes or results may be utilized in addition to, in combination with, or instead of those disclosed above without deviating from the teachings disclosed herein.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A vehicle diagnostic system compatible with a vehicle having a vehicle communication interface (VCI) operable to generate a diagnostic code, the vehicle diagnostic system comprising:
    a first diagnostic processor in data communication with the VCI;
    a first memory in data communication with the first diagnostic processor, the first memory storing thereon a first corpus of diagnostic data;
    a user interface in data communication with the first diagnostic processor;
    a second diagnostic processor in data communication with the first diagnostic processor via a wireless access point (WAP), the second diagnostic processor having a second memory storing thereon a second corpus of diagnostic data; and
    a specialty processor in data communication with the second diagnostic processor, the specialty processor having a specialty memory storing thereon a specialty corpus of diagnostic data,
    wherein the first diagnostic processor is configured to seek a vehicle diagnosis associated with the diagnostic code within the first corpus,
    the first diagnostic processor is configured to transmit via the WAP a first request for the vehicle diagnosis from the second diagnostic processor in response to the vehicle diagnosis not being found within the first corpus,
    the second diagnostic processor is configured to seek the vehicle diagnosis associated with the diagnostic code within the second corpus in response to the first request,
    the second diagnostic processor is configured to transmit to the specialty processor a second request for the vehicle diagnosis in response to the vehicle diagnosis not being found within the second corpus, and
    wherein the specialty processor is configured to seek the vehicle diagnosis within the specialty corpus, wherein the specialty processor is further configured to transmit the vehicle diagnosis to the second diagnostic processor in response to the second request, and wherein the second diagnostic processor is further configured to transmit the vehicle diagnosis to the first diagnostic processor via the WAP in response to the first request.

2. The vehicle diagnostic system of claim 1, wherein the second diagnostic processor is further configured to transmit a payment authorization request to the first diagnostic processor in response to the vehicle diagnosis not being found within the second corpus, and wherein the second diagnostic processor is configured to delay the second request until a payment authorization is generated by the user interface in response to the payment authorization request.

3. The vehicle diagnostic system of claim 1, wherein the specialty processor is further configured to generate an error message and transmit the error message to the second diagnostic processor in response to the vehicle diagnosis not being found within the specialty corpus, and wherein the second diagnostic processor is further configured to transmit the error message to the first diagnostic processor in response to receiving the error message from the specialty processor.

4. The vehicle diagnostic system of claim 1, wherein the first memory comprises a membership status stored thereon, the membership status indicating from which of the second corpus and specialty corpus the first diagnostic processor is permitted to receive data.

5. The vehicle diagnostic system of claim 4, wherein the first diagnostic processor is further configured to generate a membership upgrade request and transmit the membership upgrade request to the user interface in response to the vehicle diagnosis not being found within the first corpus and the membership status indicating that the first diagnostic processor may not receive data from the second corpus.

6. The vehicle diagnostic system of claim 4, wherein the first diagnostic processor is further configured to generate a membership upgrade request and transmit the authorization update request in response to the vehicle diagnosis not being found within the second corpus and the membership status indicating that the first diagnostic processor may not receive data from the specialty corpus.

7. The vehicle diagnostic system of claim 1, further comprising a wireless access point, wherein the data communication between the first diagnostic processor and the VCI is achieved utilizing the wireless access point.

8. The vehicle diagnostic system of claim 7, wherein the VCI is in data communication with the second diagnostic processor utilizing the wireless access point.

9. The vehicle diagnostic system of claim 1, wherein the data communication between the first diagnostic processor and the second diagnostic processor utilizes a J2534 protocol.

10. The vehicle diagnostic system of claim 1, further comprising a certification server in data communication with the first diagnostic processor and the VCI, wherein the first diagnostic processor is configured to generate a completion code in response to a completion of a repair to the vehicle that addresses the diagnostic code, the certification server configured to receive the diagnostic code from the VCI, the certification server further configured to receive the completion code, confirm that the VCI no longer generates the diagnostic code, and generate a certification code indicating that the VCI is no longer generating the diagnostic code.

11. A method of vehicle repair certification, the method comprising:
   establishing data communication between a first diagnostic processor and a vehicle communication interface (VCI) of a vehicle;
   transmitting a request for vehicle data from the first diagnostic processor to the VCI, the vehicle data comprising vehicle make information and a diagnostic code;
   the vehicle data from the VCI to the first diagnostic processor in response to the request for vehicle data;
   seeking a vehicle diagnosis within a first corpus of diagnostic data associated with the first diagnostic processor;
   generating a first request from the first diagnostic processor to a second diagnostic processor in in response to the vehicle diagnosis not being found within the first corpus, the first request comprising the vehicle data, the first request transmitted to the second diagnostic processor utilizing a wireless access point (WAP);
   seeking the vehicle diagnosis within a second corpus of diagnostic data associated with the second diagnostic processor in response to the first request;
   generating a second request from the second diagnostic processor to a specialty processor in response to the vehicle diagnosis not being found within the second corpus, the second request comprising the vehicle data;
   seeking the vehicle diagnosis within a specialty corpus of diagnostic data associated with the specialty processor in response to the second request;
   returning the vehicle diagnosis to the first diagnostic processor for output via a human-machine interface, the vehicle diagnosis routed to the first diagnostic processor using the WAP;
   requesting, by the first diagnostic processor, and updated vehicle data from the VCI in response to receiving a user input from the human-machine interface indicating completion of a repair associated with the vehicle diagnosis; and
   generating a repair certification indicator associated with the diagnostic code in response to the updated vehicle data lacking the diagnostic code.

12. The method of vehicle repair certification of claim 11, further comprising generating an error message, by the specialty processor, and transmitting the error message from the specialty processor to the first diagnostic processor in response to the vehicle diagnosis not being found within the specialty corpus.

13. The method of vehicle repair certification of claim 11, wherein the generating a repair certification indicator further comprises transmitting the updated vehicle data to a certification processor.

14. The method of vehicle repair certification of claim 11, further comprising initiating a payment transaction after the generation of the repair certification indicator, the payment transaction conducted between a payment account associated with the certification processor and a receiving account associated with the first diagnostic processor.

15. The method of vehicle repair certification of claim 11, wherein the generating the first request further comprises seeking a membership status associated with the first diagnostic processor, and generating a membership upgrade request in response to the membership status indicating that first diagnostic processor may not receive data from the second corpus.

16. The method of vehicle repair certification of claim 15, wherein the generating the second request further comprises seeking a membership status associated with the first diagnostic processor, and generating a membership upgrade request in response to the membership status indicating that first diagnostic processor may not receive data from the specialty corpus.

17. The method of vehicle repair certification of claim 15, wherein the generating the second request further comprises seeking a membership status associated with the second diagnostic processor, and generating a membership upgrade request in response to the membership status indicating that second diagnostic processor may not receive data from the specialty corpus.

18. A computer-readable non-transitory storage medium having processor-executable instructions stored thereon that, when executed by a processor, cause the processor to execute the steps of:
- establishing data communication between a first diagnostic processor and a vehicle communication interface (VCI) of a vehicle;
- transmitting a request for vehicle data from the first diagnostic processor to the VCI, the vehicle data comprising vehicle make information and a diagnostic code;
- transmitting the vehicle data from the VCI to the first diagnostic processor in response to the request for vehicle data;
- seeking a vehicle diagnosis within a first corpus of diagnostic data associated with the first diagnostic processor;
- generating a first request from the first diagnostic processor to a second diagnostic processor in in response to the vehicle diagnosis not being found within the first corpus, the first request comprising the vehicle data, the first request transmitted to the second diagnostic processor utilizing a wireless access point (WAP);
- seeking the vehicle diagnosis within a second corpus of diagnostic data associated with the second diagnostic processor in response to the first request;
- generating a second request from the second diagnostic processor to a specialty processor in response to the vehicle diagnosis not being found within the second corpus, the second request comprising the vehicle data;
- seeking the vehicle diagnosis within a specialty corpus of diagnostic data associated with the specialty processor in response to the second request;
- returning the vehicle diagnosis to the first diagnostic processor for output via a human-machine interface, the vehicle diagnosis routed to the first diagnostic processor using the WAP;
- requesting, by the first diagnostic processor, and updated vehicle data from the VCI in response to receiving a user input from the human-machine interface indicating completion of a repair associated with the vehicle diagnosis; and
- generating a repair certification indicator associated with the diagnostic code in response to the updated vehicle data lacking the diagnostic code.

19. The computer-readable non-transitory storage medium of claim 18, further comprising processor-executable instructions stored thereon that, when executed by a processor, cause the processor to direct the specialty processor to generate and transmit an error message from the specialty processor to the first diagnostie processor in response to the vehicle diagnosis not being found within the specialty corpus.

* * * * *